United States Patent
Parry et al.

(10) Patent No.: US 10,217,380 B2
(45) Date of Patent: Feb. 26, 2019

(54) WOUND BOX TRAINER

(71) Applicant: Techline Technologies, Inc., Willow Grove, PA (US)

(72) Inventors: Daniel J. Parry, Perkasie, PA (US); Jonathan A. Closeme, Lansdale, PA (US); David J. Parry, Jr., Yardley, PA (US); Anthony R. Grillo, Coatesville, PA (US)

(73) Assignee: Techline Technologies, Inc., Willow Grove, PA (US)

( * ) Notice: Subject to any disclaimer, the term of this patent is extended or adjusted under 35 U.S.C. 154(b) by 465 days.

(21) Appl. No.: 15/144,007

(22) Filed: May 2, 2016

(65) Prior Publication Data

US 2016/0247419 A1    Aug. 25, 2016

Related U.S. Application Data

(63) Continuation-in-part of application No. 15/045,295, filed on Feb. 17, 2016, which is a continuation-in-part of application No. 13/925,949, filed on Jun. 25, 2013, now Pat. No. 9,280,917, which is a continuation-in-part of application No. 13/532,848, filed on Jun. 26, 2012, now Pat. No. 8,491,309, which is a continuation-in-part of application No. 12/131,980, filed on Jun. 3, 2008, now Pat. No. 8,221,129.

(60) Provisional application No. 61/681,856, filed on Aug. 10, 2012.

(51) Int. Cl.
*G09B 23/30* (2006.01)
*G09B 9/00* (2006.01)

(52) U.S. Cl.
CPC ............. *G09B 23/30* (2013.01); *G09B 9/003* (2013.01)

(58) Field of Classification Search
CPC ................................ G09B 23/30; G09B 23/28
See application file for complete search history.

(56) References Cited

U.S. PATENT DOCUMENTS

| | | | | |
|---|---|---|---|---|
| 2,704,897 A | * | 3/1955 | Lade | G09B 23/285 434/272 |
| 2,871,579 A | | 2/1959 | Niiranen et al. | |
| 2,871,584 A | * | 2/1959 | Poole | G09B 23/285 434/268 |

(Continued)

*Primary Examiner* — Jason Skaarup
(74) *Attorney, Agent, or Firm* — Michael Crilly, Esquire (57) ABSTRACT

A training device applicable to training personnel in the treatment of a traumatic injury is presented. The wound box trainer includes a case, a compressible body, a wound structure, and an annular cavity. The case further includes a base and a lid. The compressible body simulates a portion of a body and further includes a top surface and a bottom surface. The compressible body resides within the base. The wound structure simulates an injury disposed along the compressible body. The wound structure includes a wound cavity which extends into the compressible body. An annular cavity extends into the compressible body about the wound cavity. The annular cavity permits movement and/or expansion of a wall defined by and between the wound cavity and the annular cavity when probed by a finger or instrument and packed with gauze, bandages, and the like during treatment of the wound structure to stem blood lose from a bleed tube.

18 Claims, 7 Drawing Sheets

(56) References Cited

U.S. PATENT DOCUMENTS

| | | | |
|---|---|---|---|
| 2,995,832 A * | 8/1961 | Alderson | A61M 5/00 |
| | | | 434/268 |
| 3,027,655 A | 4/1962 | Alderson | |
| 3,852,893 A | 12/1974 | Smrcka | |
| 4,789,340 A | 12/1988 | Zikria | |
| 5,775,916 A | 7/1998 | Cooper et al. | |
| 5,873,863 A | 2/1999 | Komlosi et al. | |
| 6,638,073 B1 | 10/2003 | Kazimirov et al. | |
| 7,850,454 B2 | 12/2010 | Toly | |
| 7,988,451 B2 * | 8/2011 | Battaglia, Jr. | G09B 23/285 |
| | | | 434/262 |
| 8,221,129 B2 * | 7/2012 | Parry | G09B 23/30 |
| | | | 434/272 |
| 8,491,309 B2 * | 7/2013 | Parry | G09B 23/30 |
| | | | 434/272 |
| 8,558,050 B2 * | 10/2013 | Aali | A61F 13/00068 |
| | | | 128/888 |
| 8,568,147 B2 * | 10/2013 | Kuo | G09B 23/30 |
| | | | 434/262 |
| 8,586,818 B2 * | 11/2013 | Aali | A61F 13/0203 |
| | | | 128/893 |
| 8,669,408 B2 * | 3/2014 | Aali | A61F 15/008 |
| | | | 128/888 |
| 8,840,403 B2 | 9/2014 | Segall | |
| 9,280,917 B2 * | 3/2016 | Parry, Jr. | G09B 9/003 |
| 2007/0292829 A1 * | 12/2007 | King | G09B 23/285 |
| | | | 434/268 |
| 2009/0011394 A1 * | 1/2009 | Meglan | G09B 23/28 |
| | | | 434/268 |
| 2010/0196865 A1 | 8/2010 | Kays et al. | |
| 2013/0078604 A1 * | 3/2013 | King | G09B 23/28 |
| | | | 434/268 |
| 2013/0192741 A1 | 8/2013 | Trotta et al. | |
| 2013/0224712 A1 * | 8/2013 | Day | G09B 23/303 |
| | | | 434/268 |
| 2013/0274688 A1 * | 10/2013 | Weston | A61F 5/048 |
| | | | 604/290 |
| 2013/0309643 A1 | 11/2013 | Segall | |
| 2014/0057236 A1 * | 2/2014 | Meglan | G09B 23/30 |
| | | | 434/268 |
| 2015/0024363 A1 | 1/2015 | Segall | |
| 2015/0140537 A1 | 5/2015 | Grinevich et al. | |
| 2015/0364052 A1 * | 12/2015 | Blankenship | G09B 5/00 |
| | | | 434/11 |
| 2016/0071436 A1 * | 3/2016 | Segall | G09B 23/28 |
| | | | 434/272 |
| 2016/0171911 A1 * | 6/2016 | Parry, Jr. | G09B 23/303 |
| | | | 434/268 |
| 2016/0260357 A1 * | 9/2016 | King | G09B 23/28 |
| 2016/0300509 A1 * | 10/2016 | Spotnitz | G09B 23/28 |
| 2017/0053563 A1 * | 2/2017 | Holloway | G09B 23/28 |
| 2017/0193858 A1 * | 7/2017 | Segall | G09B 23/303 |
| 2017/0345339 A1 * | 11/2017 | Normand | G09B 23/28 |

\* cited by examiner

WOUND BOX TRAINER

CROSS REFERENCE TO RELATED APPLICATIONS

This application is a continuation-in-part of co-pending U.S. Non-Provisional application Ser. No. 15/045,295 filed Feb. 17, 2016 entitled Torso Simulant with Vascular Elements Mechanically Responsive to a Tourniquet which claims priority to U.S. Non-Provisional application Ser. No. 13/925,949 filed Jun. 25, 2013 entitled Simulant with Vascular Structure Mechanically Responsive to a Tourniquet now U.S. Pat. No. 9,280,917 which claims priority to U.S. Provisional Application No. 61/681,856 filed Aug. 10, 2012 entitled Simulant with Vascular Structure Mechanically Responsive to a Tourniquet; furthermore U.S. Non-Provisional application Ser. No. 13/925,949 now U.S. Pat. No. 9,280,917 is a continuation-in-part of U.S. Non-Provisional application Ser. No. 13/532,848 filed Jun. 26, 2012 entitled Wearable Wound Simulant now U.S. Pat. No. 8,491,309 which is a continuation-in-part of U.S. Non-Provisional application Ser. No. 12/131,980 filed Jun. 3, 2008 entitled Wearable Wound Simulant now U.S. Pat. No. 8,221,129; all prior applications are hereby incorporated in their entirety by reference thereto.

FEDERALLY SPONSORED RESEARCH AND DEVELOPMENT

None.

BACKGROUND OF THE INVENTION

1. Field of the Invention

The invention generally relates to a device for medical training purposes. Specifically, the invention comprises a simulant disposed within an openable/closable case whereby the simulant simulates a portion of a body, human or animal, with a wound structure including features permitting movement and expansion thereby when probed and packed.

2. Background

Mannequins and wearable simulants are commonly employed to train civilian and military personnel as to the proper treatment of penetrating and non-penetrating injuries. The purpose of such training is to instill the skills required to stabilize the medical condition of a patient before and during transport to a medical facility.

Mannequins and wearable simulants replicate the appearance and tactile properties of flesh, tissues, bones and organs, as well as penetrating and non-penetrating injuries thereto. Training devices often include tubes which allow a liquid simulating blood flow to and out of an injury. The combination of visual, tactile, and functional properties ensure a more realistic representation of an injury. However, mannequins and wearable simulants are costly and often include features and details that improve the overall realism of a training experience but otherwise not required for training purposes.

Some training devices are suited to a form which permits use within a container. For example, Niiranen et al. in U.S. Pat. No. 2,871,579 and Komlosi et al. in U.S. Pat. No. 5,873,863 separately describe a training simulant disposed within a box-like structure that functions as a readily convenient means for transporting and protecting the simulant and components related thereto after use.

The housings in Niiranen et al. and Komlosi et al. are problematic in that each box-like structure constrains movement and compression of the simulant when a wound cavity is probed by a finger or instrument or packed with gauze or other materials. The result is a simulant which does not adequately simulate compression of flesh, tissues, and organs disposed about a wound and resultant expansion of the wound cavity, thus impeding probing and packing of the wound and negating the value of the device as a training tool.

Accordingly, what is required is a training device including a simulant disposed within a carrying case whereby the case does not compromise movement and compression of the simulant immediately adjacent to a wound structure in response to probing and packing.

SUMMARY OF THE INVENTION

An object of the invention is a training device including a simulant disposed within a carrying case whereby the case does not compromise movement and compression of the simulant immediately adjacent to a wound structure in response to probing and packing.

In accordance with embodiments of the invention, the wound box trainer includes a case, a compressible body, a wound structure, and an annular cavity. The compressible body simulates a portion of a body and further includes a top surface and a bottom surface. The compressible body resides within the case. The wound structure is disposed along the compressible body. The wound structure includes a wound cavity which extends into the compressible body. The annular cavity extends into the compressible body about the wound cavity. The annular cavity permits movement or expansion of a wall defined by and disposed between the wound cavity and the annular cavity.

In accordance with other embodiments of the invention, the case includes a base and a lid and the compressible body resides within and contacts the base.

In accordance with other embodiments of the invention, the compressible body includes a surface layer and a subsurface layer whereby the surface layer is pigmented.

In accordance with other embodiments of the invention, the annular cavity and the wound cavity partially overlap.

In accordance with other embodiments of the invention, the wound cavity extends into the compressible body from the top surface.

In accordance with other embodiments of the invention, the compressible body includes a surface layer and a subsurface layer whereby the wound cavity extends into the surface layer.

In accordance with other embodiments of the invention, the compressible body includes a surface layer and a subsurface layer whereby the wound cavity extends into the surface layer and the subsurface layer.

In accordance with other embodiments of the invention, the wound structure includes a surface feature disposed about the wound cavity and the surface feature simulates damage about the wound cavity.

In accordance with other embodiments of the invention, the annular cavity extends into the compressible body from the bottom surface.

In accordance with other embodiments of the invention, the compressible body includes a surface layer and a subsurface layer whereby the annular cavity extends into the subsurface layer.

In accordance with other embodiments of the invention, the compressible body includes a surface layer and a subsurface layer whereby the annular cavity extends into the subsurface layer and the surface layer.

In accordance with other embodiments of the invention, a bleed tube communicates at one end to the wound cavity.

In accordance with other embodiments of the invention, a channel is disposed along the compressible body and the bleed tube contacts the channel.

In accordance with other embodiments of the invention, the bleed tube is secured to the compressible body.

In accordance with other embodiments of the invention, the bleed tube is secured to the compressible body via an outer layer.

In accordance with other embodiments of the invention, the wound structure simulates a penetration-induced wound.

In accordance with other embodiments of the invention, the wound structure simulates a blast-induced wound.

In accordance with other embodiments of the invention, the compressible body includes at least one runner which traverses a portion of the annular cavity.

Several advantages are offered by the invention. The simulant is readily removable from the casing and thereby replaceable and repairable. The invention permits movement of the wall about a wound cavity when probed thereby simulating the movement of tissues, flesh, organs, and the like disposed about a wound. The invention permits expansion and contraction of the wall along a wound cavity thereby simulating the movement of tissues, flesh, organs, and the like disposed about a wound required for expansion and contraction of the wound cavity. The invention permits a wound cavity to conform to gauze and other materials inserted into a wound for the purpose of stemming flow of a blood simulant from a vascular simulant.

The above and other objectives, features, and advantages of the preferred embodiments of the invention will become apparent from the following description read in connection with the accompanying drawings, in which like reference numerals designate the same or similar elements.

| REFERENCE NUMERALS | |
|---|---|
| 1 | Wound box trainer |
| 2 | Case |
| 3 | Base |
| 4 | Lid |
| 5 | Hinge |
| 6 | Simulant |
| 7 | Compressible body |
| 8 | Wound structure |
| 9 | Bleed tube |
| 10 | Surface layer |
| 11 | Subsurface layer |
| 12 | Channel |
| 13 | Annular cavity |
| 14 | Wound cavity |
| 15 | Surface feature |
| 16 | Top surface |
| 17 | Bottom surface |
| 18 | Outer layer |
| 19 | Runner |
| 20 | Wall |
| 21 | Side |
| 22 | Downstream end |
| 23 | Upstream end |

BRIEF DESCRIPTION OF THE DRAWINGS

Additional aspects, features, and advantages of the invention will be understood and will become more readily apparent when the invention is considered in the light of the following description made in conjunction with the accompanying drawings.

DETAILED DESCRIPTION OF THE INVENTION

Reference will now be made in detail to several embodiments of the invention that are illustrated in the accompanying drawings. Wherever possible, same or similar reference numerals are used in the drawings and the description to refer to the same or like parts. The drawings are in simplified form and are not to precise scale.

While features of various embodiments are separately described throughout this document, it is understood that two or more such features could be combined into a single embodiment.

The simulants and tubes described herein may be fabricated via cast methods understood in the art.

Figure 1:
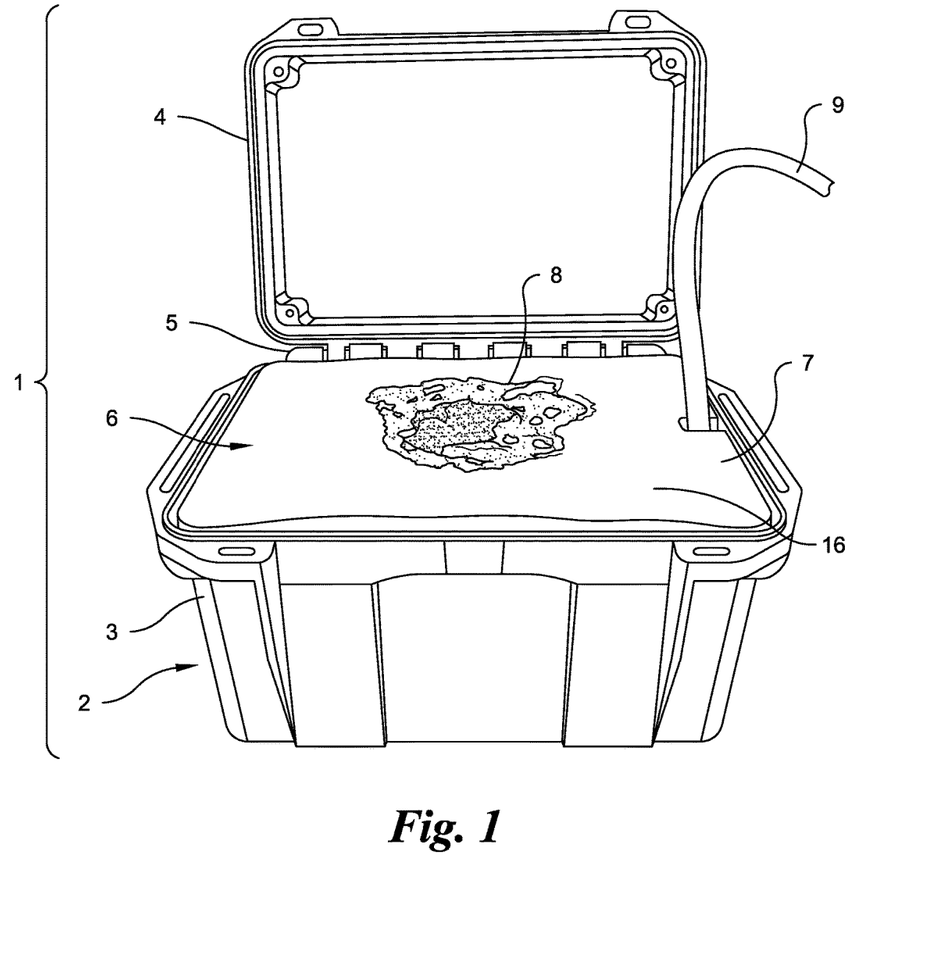
FIG. 1 is a front side perspective view illustrating a wound box trainer including a simulant disposed within a base of a case with a closable lid attached thereto and a wound structure disposed along the simulant with an optional tube in accordance with an embodiment of the invention.

Referring now to FIG. 1, the wound box trainer 1 generally includes a simulant 6 disposed within a case 2. The simulant 6 further includes a compressible body 7, a wound structure 8 disposed along the compressible body 7, and an optional bleed tube 9 extendable from the case 2.

Referring again to FIG. 1, the case 2 may further include a base 3 and a lid 4. The base 3 and lid 4 may be composed of materials suitable for use within a case 2, examples including, but not limited to, plastics and metals. The base 3 and lid 4 generally define a cavity of sufficient volume to hold and support the simulant 6. A hinge 5 may be attached to the base 3 and lid 4 so as to allow the lid 4 to be openable and closable with respect to the base 3. It is likewise possible for other connecting means understood in the art to allow the lid 4 to be attachable to and detachable from the base 3 so that the lid 4 is combinable with and separable from the base 3. Regardless of the means employed to open and close the case 2, the base 3 and lid 4 should permit access to and use of the simulant 6 in an open configuration. The interface between base 3 and lid 4 may limit or prevent infiltration of a gas and/or a liquid into the case 2 in a closed configuration. Handle and locking mechanisms (not shown) may be included in some embodiments.

While it is understood that various designs are possible for the case 2, the purpose of the case 2 is to facilitate storage of a simulant 6 when not in use, transport of a simulant 6 to and from a training session, and use of a simulant 6 during a training session. The depth of the simulant 6 may allow the top surface 16 along the compressible body 7 to extend above, to reside below, or to align approximately with the top of the base 3, the latter being a preferred embodiment as illustrated in FIG. 1. One specific, non-limiting exemplary case 2 is the UltraBox™, model no. 406, sold by Underwater Kinetics located in Poway, Calif.

Figure 2:
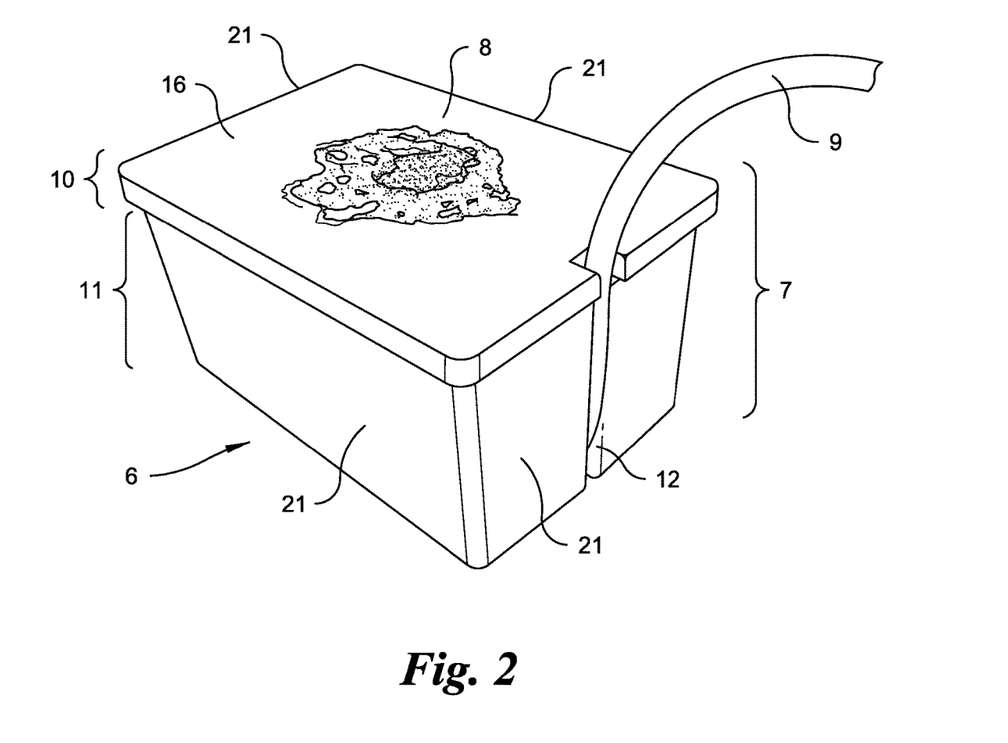
FIG. 2 is a top side perspective view illustrating a simulant including a compressible body with a surface layer and a subsurface layer and a wound structure disposed along the simulant with an optional tube traversing a channel along the compressible body in accordance with an embodiment of the invention.
Figure 3:
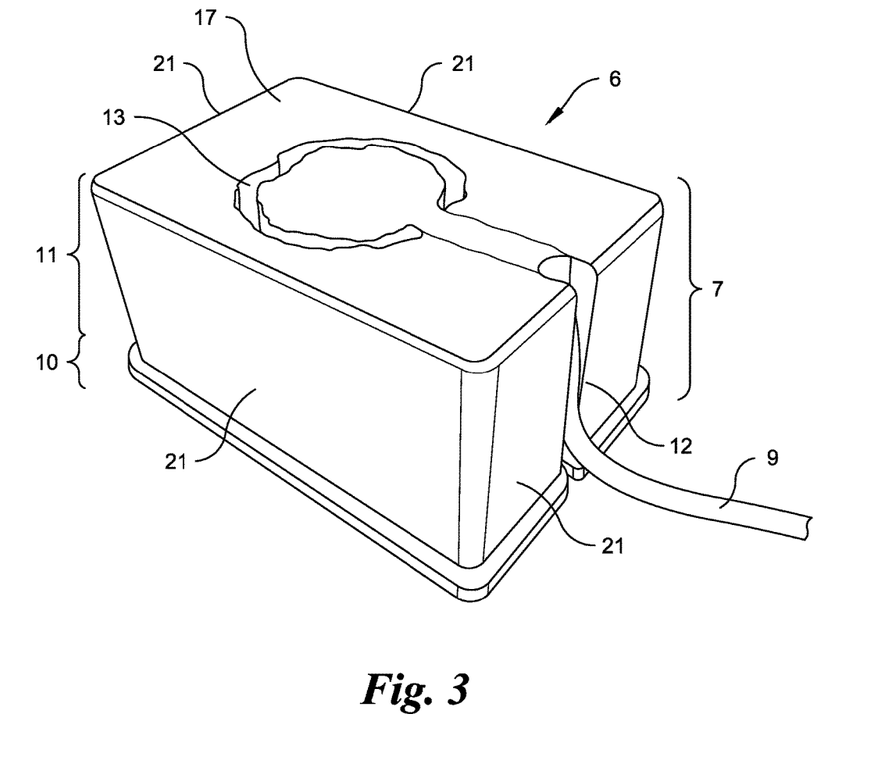
FIG. 3 is a bottom side perspective view illustrating a simulant including a compressible body with an optional bleed tube traversing a channel along the side and top of the compressible body and an annular channel extending into the compressible body in accordance with an embodiment of the invention.

Referring now to FIGS. 2 and 3, the simulant 6 is comprised of a compressible body 7 with a wound structure 8 thereon. The compressible body 7 may be composed of one or more layers of one more polymer materials, one non-limiting example being silicone. The compressible body 7 should deform when a force is applied thereto, yet be sufficiently resilient to recover its original shape after the force is removed. In preferred embodiments, the compressible body 7 further includes a surface layer 10 and a subsurface layer 11. It is likewise possible for the surface layer 10 and subsurface layer 11 to each be composed of one or more layers of one or more polymer materials. In one example, the surface layer 10 could include one or more layers with pigmentation, as described in U.S. Pat. No. 8,221,129 entitled Wearable Wound Simulant which is incorporated in its entirety by reference thereto, and the subsurface layer 11 could be a single cold cast resin without pigmentation. In some embodiments, a bone simulant (not shown) or the like could be partially or complete embedded within the compressible body 7. The compressible body 7 is shaped and dimensioned to permit assembly into and with the base 3 whereby the sides 21 and the bottom surface 17 contact corresponding surfaces along the interior of the base 3.

Referring again to FIGS. 2 and 3, the compressible body 7 may include a channel 12 disposed along one side 21 and the bottom surface 17. The channel 12 may be formed via either cast or machining techniques. The channel 12 should be sufficiently wide and deep so that a bleed tube 9 is recessed within the compressible body 7 when the bleed tube 9 contacts the channel 12. An annular cavity 13 is either cast or machined into the compressible body 7 so as to extend into the compressible body 7 from the bottom surface 17.

Figure 4:
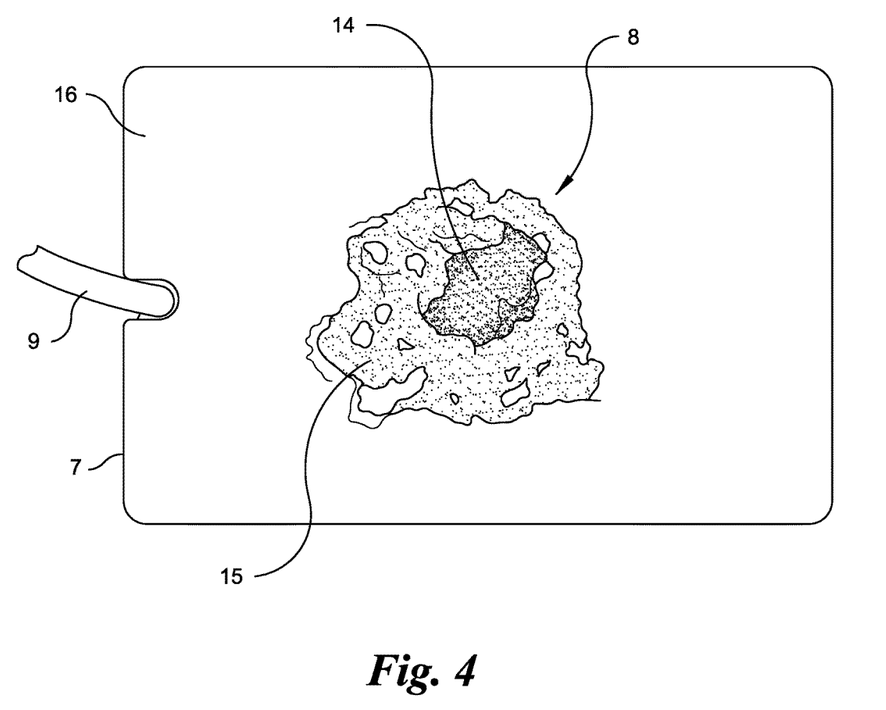
FIG. 4 is a top side view illustrating a compressible body with a wound structure including a wound cavity extending into the compressible body and an optional surface feature about the cavity with an optional bleed tube at one side of the compressible body in accordance with an embodiment of the invention.
Figure 5:
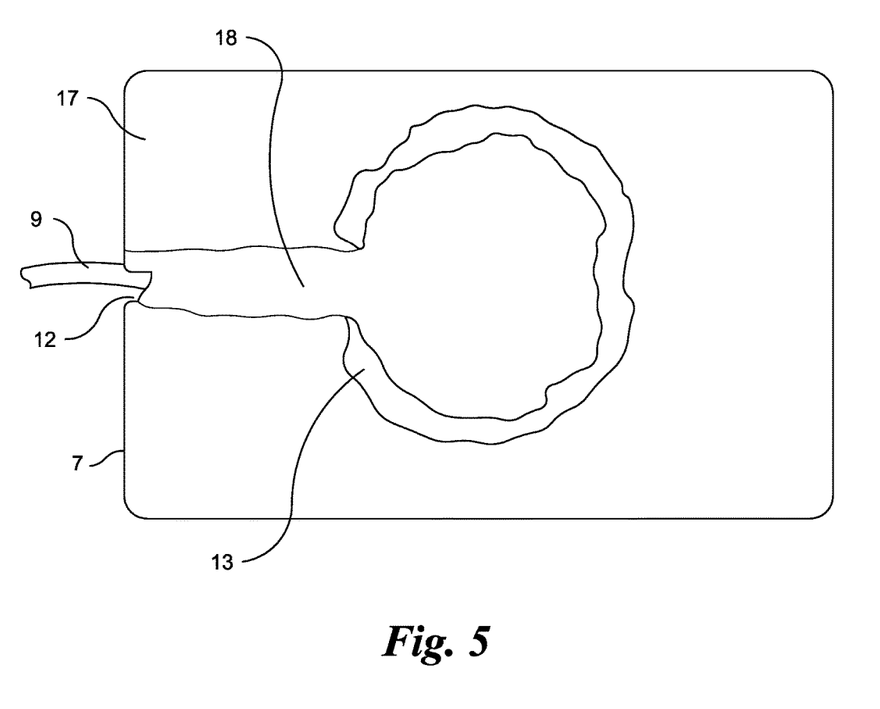
FIG. 5 is a bottom side view illustrating an annular cavity extending into a compressible body about a wound cavity (not shown) and an optional bleed tube communicating with the wound cavity in accordance with an embodiment of the invention.

Referring now to FIGS. 4 and 5, a wound structure 8 and an annular cavity 13 are provided along the compressible body 7. The wound structure 8 further includes a wound cavity 14 that extends into the compressible body 7 from the top surface 16 in the direction of the bottom surface 17. In some embodiments, it might be advantageous to include a surface feature 15 disposed about the wound cavity 14. The surface feature 15 may include textures, coloring, and other features and elements that simulate damaged flesh, tissues, bones, and the like about a wound cavity 14. The annular cavity 13 extends from the bottom surface 17 into the compressible body 7 in the direction of the top surface 16. The annular cavity 13 is positioned circumferentially about the wound cavity 14.

Referring again to FIGS. 4 and 5, the bleed tube 9 may traverse a channel 12 along a portion of the bottom surface 17. One end of the bleed tube 9 terminates and thereby communicates with the wound cavity 14. The bleed tube 9 may be secured to the compressible body 7 via an outer layer 18. The outer layer 18 may be composed of a layer of silicone adhesive or other cold curable resin.

Figure 6:
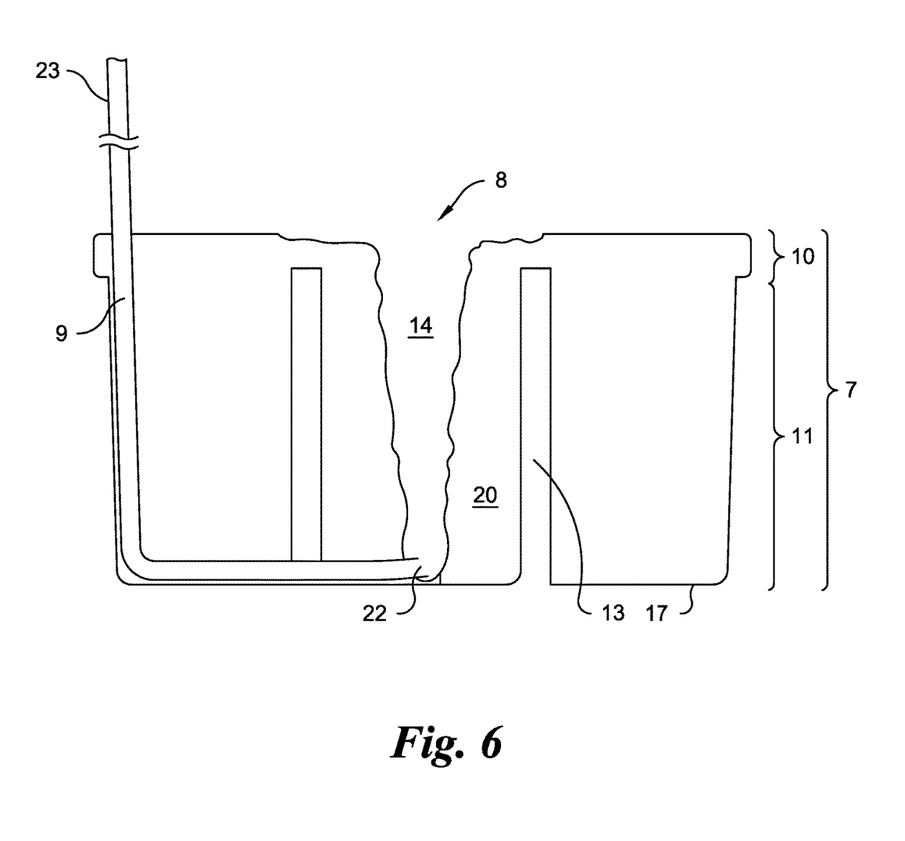
FIG. 6 is cross section view illustrating a bleed tube disposed along a channel traversing the side and bottom of a compressible body and an annular cavity extending into the compressible body about a wound cavity in accordance with an embodiment of the invention.

Referring now to FIG. 6, the wound cavity 14 and the annular cavity 13 are arranged so as to at least partially overlap within the compressible body 7. This arrangement places the annular cavity 13 about the wound cavity 14. In some embodiments, the wound cavity 14 may extend into the compressible body 7 so as to only partially traverse the surface layer 10. In other embodiments, the wound cavity 14 may extend into the compressible body 7 so as to completely traverse the surface layer 10 and partially traverse the subsurface layer 11. In yet other embodiments, the wound cavity 14 may extend into the compressible body 7 so as to completely traverse the surface layer 10 and the subsurface layer 11.

Referring again to FIG. 6, the annular cavity 13 may extend into the compressible body 7 so as to only partially or complete traverse the subsurface layer 11 with or without extension into the surface layer 10. While the wound cavity 14 may completely traverse the depth of the compressible body 7, the annular cavity 13 may only partially traverse the depth of the compressible body 7.

Referring again to FIG. 6, the downstream end 22 of the bleed tube 9 resides within the wound box trainer 1 and extends to the wound cavity 14. This arrangement allows communication of a blood simulant from the bleed tube 9 into the wound cavity 14. The bleed tube 9 may be composed of a silicone-based resin or other material suitable for use with a blood simulant. The upstream end 23 of the bleed tube 9 may communicate with a pump (not shown) or the like to ensure continuous flow of a blood simulant into the wound cavity 14. The pump could reside within or be external to the wound box trainer 1. In preferred embodiments, the fluid pressures produced by the pump should approximate the pressures of blood within and flowing from a vascular element. This feature ensure a more realistic interaction between a blood simulant exiting the bleed tube 9 and packing materials and probes within the wound cavity 14.

The treatment of a wound typically requires both probing and packing. Probing is the process whereby a finger or instrument is inserted into a wound cavity 14 so as to identify and remove projectile fragments and the like and to identify the source(s) of bleeds. Packing is the process whereby gauze and other materials are inserted into a wound cavity 14 so as to reduce or stem blood flow from a compromised vascular element. The present invention facilitates a realistic response by a wound structure 8 to both probing and packing by permitting movement and/or expansion of the compressible body 7 immediately adjacent to a wound cavity 14.

Referring again to FIG. 6, the wound cavity 14 and the annular cavity 13 are separated by a wall 20 comprised of a portion of the compressible body 7 between the wound cavity 14 and the annular cavity 13. The wall 20 generally defines a pocket-like structure within the simulant 6 which extends into the compressible body 7 in the direction of the bottom surface 17. While the sides of the wall 20 do not initially contact other portions of the compressible body 7 because of the annular cavity 13, the top end of the wall 20 contacts and is attached to other portions of the compressible body 7.

The wall 20 may be readily movable when probed and/or packed. This functionality permits the wall 20 to translate or rotate so that the width of the annular cavity 13 decreases in the direct of a force applied onto the wall 20 from within the wound cavity 14. This response type is typically associated with no or limited thinning of the wall 20 immediately adjacent to the movement. Preferred embodiments require the wall 20 to return and recover to its original position after a deforming force is removed.

The wall 20 may be readily expandable and contractible when probed and/or packed. This functionality permits the wall 20 to expand radially outward so that the width of the annular cavity 13 circumferentially decreases in the direct of a force applied onto the wall 20 from within the wound cavity 14. This response is typically associated with thinning of the wall 20 immediately adjacent to the expansion. The wall 20 may also contract radially inward so that the width of the annular cavity 13 circumferentially increases when a force is removed from the wall 20 within the wound cavity 14. This response is typically associated with thickening of the wall 20 immediately adjacent to the contraction. Preferred embodiments require the wall 20 to return and recover its original shape after a deforming force is removed.

In some embodiments, the wall 20 may only permit movement. In other embodiments, the wall 20 may only permit expansion. In yet embodiments, movement and expansion may be permissible. The degree to which movement and/or expansion occurs is determined in part by the thickness of the wall 20, the width of the annular cavity 13, the material(s) comprising the compressible body 7, and the forces applied to the wall 20 during probing and packing.

It is understood that the movement and/or expansion permitted by the wall 20 approximates compression of flesh, tissues, and organs adjacent to a wound cavity 14 thereby simulating movement and expansion of the interior sides along a wound cavity 14. The annular cavity 13 minimizes resistance to compression by the compressible body 7 when probed and packed by permitting a region whereby movement and/or expansion by the wall 20 occurs without initially contacting other portions of the compressible body 7 immediately adjacent to the translating or rotating portion of the wall 20. This resistance is associated with the confinement effects imposed by contact between the base 3 and the sides 21 and the bottom surface 17 along the compressible body 7.

Figure 7A:
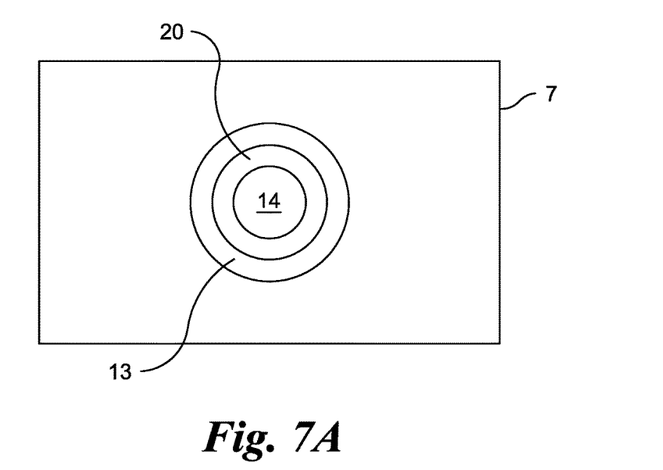
FIG. 7a is a cross section view illustrating an annular cavity circumferentially disposed about a wound cavity without runner in accordance with an embodiment of the invention.
Figure 7B:
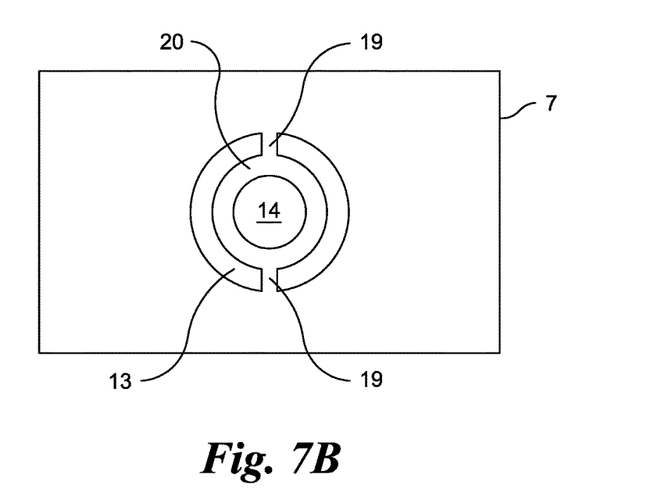
FIG. 7b is a cross section view illustrating an annular cavity circumferentially disposed about a wound cavity with runners in accordance with an embodiment of the invention.

Referring now to FIGS. 7a and 7b, the wall 20 is composed of a portion of the compressible body 7 and generally defined by and positioned between the annular cavity 13 and the wound cavity 14. The wall 20 should be sufficiently thick so as to prevent punctures or tears that could otherwise compromise the ability of the wound cavity 14 to fill with and hold a blood simulant entering via the bleed tube 9. In some embodiments, the annular cavity 13 should completely encircle the side of the wall 20 thereby separating it from other portions of the compressible body 7 as represent in FIG. 7a. In other embodiments, the side of the wall 20 could be partially secured to a portion of the compressible body 7 via one or more runners 19 as represented in FIG. 7b. The runner 19 could be a web-like element that traverses a portion of the depth of the compressible body 7 so as to provide lateral support to the wall 20 along a portion of the circumference of the wound cavity 14. The runner(s) 19 may induce asymmetries in the movement and expansion of the wall 20 as might be imposed by flesh, tissues, bones, and the like adjacent to the wound cavity 14.

Referring again to FIGS. 1 and 6, the wound box trainer 1 is opened by separating the lid 4 from the base 3. If a hinge 5 is provided between the lid 4 and base 3, then the lid 4 is rotated up and away from the base 4. Separation of the lid 4 from the base 3 exposes the simulant 6 so that the top surface 16 is clearly visible and the wound structure 8 and bleed tube 9 are accessible. The bleed tube 9 is removed from the case 2 and extended therefrom for attachment to a pump (not shown) communicable with a reservoir or the like containing a blood simulant. The pump may be manually operable or motorized. Once engaged and powered, the pump communicates the blood simulant into the bleed tube 9. The bleed tube 9 communicates the blood simulant into the wound cavity 14 at the location wherein the bleed tube 9 enters the wound cavity 14.

The wound box trainer 1 is used as an instructional tool to demonstrate treatment techniques required to properly limit or stem blood lose from a wound structure 8 caused by a compromised vascular element. The compromised vascular element is simulated by the bleed tube 9. The wound box trainer 1 permits the trainee to practice various treatment techniques via probing and packing of the wound structure 8.

The wound box trainer 1 may include one or more wound types, examples including but not limited to, a wound structure 8 with a wound cavity 14 associated with a penetration-induced injury or a wound structure 8 associated with a blast-induced injury. Exemplary penetration-induced injuries include, but are not limited to, a wound cavity 14 produced by a bullet, fragment, projectile, or the like. Exemplary blast-induced injuries include, but are not limited to, a wound cavity 14 produced explosive pressures that either directly or indirectly penetrate or tear flesh, tissues, and organs.

The description above indicates that a great degree of flexibility is offered in terms of the present invention. Although various embodiments have been described in considerable detail with reference to certain preferred versions thereof, other versions are possible. Therefore, the spirit and scope of the appended claims should not be limited to the description of the preferred versions contained herein.

What is claimed is:

1. A wound box trainer for medical training purposes comprising:
    (a) a case;
    (b) a compressible body which simulates a portion of a body, said compressible body includes a top surface and a bottom surface, said compressible body resides within and contacts said case;
    (c) a wound structure disposed along said compressible body, said wound structure includes a wound cavity which extends into said compressible body; and
    (d) an annular cavity which extends into said compressible body about said wound cavity, said annular cavity permits movement or expansion of a wall defined by and disposed between said wound cavity and said annular cavity.

2. The wound box trainer of claim 1, wherein said case includes a base and a lid, said compressible body resides within and contacts said base.

3. The wound box trainer of claim 1, wherein said compressible body includes a surface layer and a subsurface layer, said surface layer is pigmented.

4. The wound box trainer of claim 1, wherein said annular cavity and said wound cavity partially overlap.

5. The wound box trainer of claim 1, wherein said wound cavity extends into said compressible body from said top surface.

6. The wound box trainer of claim 5, wherein said compressible body includes a surface layer and a subsurface layer, said wound cavity extends into said surface layer.

7. The wound box trainer of claim 5, wherein said compressible body includes a surface layer and a subsurface layer, said wound cavity extends into said surface layer and said subsurface layer.

8. The wound box trainer of claim 1, wherein said wound structure includes a surface feature disposed about said wound cavity, said surface feature simulates damage about said wound cavity.

9. The wound box trainer of claim 1, wherein said annular cavity extends into said compressible body from said bottom surface.

10. The wound box trainer of claim 9, wherein said compressible body includes a surface layer and a subsurface layer, said annular cavity extends into said subsurface layer.

11. The wound box trainer of claim 9, wherein said compressible body includes a surface layer and a subsurface layer, said annular cavity extends into said subsurface layer and said surface layer.

12. The wound box trainer of claim 1, further comprises:
 (e) a bleed tube which communicates at one end to said wound cavity.

13. The wound box trainer of claim 12, further comprises:
 (f) a channel disposed along said compressible body, said bleed tube contacts said channel.

14. The wound box trainer of claim 12, wherein said bleed tube is secured to said compressible body.

15. The wound box trainer of claim 12, wherein said bleed tube is secured to said compressible body via an outer layer.

16. The wound box trainer of claim 1, wherein said wound structure simulates a penetration-induced wound.

17. The wound box trainer of claim 1, wherein said wound structure simulates a blast-induced wound.

18. The wound box trainer of claim 1, wherein said compressible body includes at least one runner which traverses a portion of said annular cavity.

* * * * *